United States Patent

[11] 3,615,685

| [72] | Inventors | Eric Fantozzi, 20 Norwood Crescent Alloa, Scotland;<br>William E. Trevelyan, 7 The Knolls, Epson Downs, Surrey, England |
|---|---|---|
| [21] | Appl. No. | 777,160 |
| [22] | Filed | Nov. 19, 1968 |
| [45] | Patented | Oct. 26, 1971 |
| [32] | Priority | Nov. 23, 1967 |
| [33] | | Great Britain |
| [31] | | 53280/67 |

[54] PREPARATION OF ACTIVE DRY YEAST
5 Claims, No Drawings

| [52] | U.S. Cl. | 99/96, 99/199, 195/98 |
|---|---|---|
| [51] | Int. Cl. | A23j 1/18 |
| [50] | Field of Search | 99/96; 195/74, 98 |

[56] References Cited
UNITED STATES PATENTS

| 1,420,557 | 6/1922 | Klein | 195/74 |
|---|---|---|---|
| 3,407,072 | 10/1968 | Aizawa et al. | 99/96 |

OTHER REFERENCES

Thorn, et al. Cereal Science Today. Vol. 4 No. 7 Sept. 1959 (pages 198–200 & 213).

*Primary Examiner*—Lionel M. Shapiro
*Assistant Examiner*—D. M. Naff
*Attorney*—Jacobs & Jacobs

ABSTRACT: An aqueous suspension of yeast is sprayed into a drying atmosphere. The conditions are selected so that the average particle size of the product is between about 15 and about 500 microns, preferably 20 and 200 microns and its dry matter content is between about 27 percent and about 50 percent, preferably 40 to 45 percent by weight. Further drying can be effected under mild conditions avoiding mechanical agitation or pressure to give an active dried yeast product containing up to about 97 percent, by weight, of dry matter.

PREPARATION OF ACTIVE DRY YEAST

This invention is concerned with the production of baker's yeast including active dried yeast. In existing methods for the production of these products yeast is grown in a liquid nutrient medium containing carbohydrate, nitrogen in a form in which it is available to the yeast and other ingredients in minor proportions, for instance, phosphorus. The yeast is separated from the medium, for instance by centrifuging, and some water is then removed by filtration. The resulting crumblike product contains about 27 percent to 34 percent of dry matter and is usually compressed into blocks of yeast of a convenient size for marketing. Alternatively, it can be dried to about 92 percent of dry matter using conventional drying methods. In one of these the product is pressed through orifices and then dried in a rotating drum. The product is known as "active dried yeast" or ADY and this can be reconstituted by mixing with water to give a suspension containing live yeast cells which can then be used for the same purposes as the compressed product. Active dried yeast prepared in this way is usually sold in the form of pellets which are of such a size that they pass through an 8 mesh sieve, but are retained on a 40 mesh sieve.

It is an object of the present invention to produce baker's yeast and active dried yeast by a process which has advantages over those previously proposed.

According to the invention the method of preparing baker's yeast comprises spray drying an aqueous suspension of yeast under conditions which will yield a product consisting of discrete particles whose average diameter is between about 15 and about 500 microns, but including some agglomerates thereof, preferably from 20 to 200 microns and which contains from about 27 percent to about 50 percent of dry matter, preferably from 40 percent to 45 percent of dry matter by weight.

The aqueous suspension of yeast suitable for use according to the present invention is made in well-known manner by any method whereby yeast, usually a strain of *Saccharomyces cerevisiae* is propagated in a nutrient medium. For instance it can be obtained by aerating a dilute solution of sugar supplemented by sources of nitrogen and phosphorus in a form available to the organism with which the solution has been inoculated. If the invention is to be used for the production of active dried yeast, care must be taken to select a suitable strain of yeast and to have conditions in the fermentation which are known to be satisfactory for the production of active dried yeast. Such strains and conditions are already well known in the yeast manufacturing art.

This suspension which contains about 4 percent by weight of dry matter may be used as such but preferably it is concentrated, for example by centrifuging to form a liquid of creamy consistency having about 15 percent of dry matter by weight.

The spray drying of the yeast suspension can be effected in any suitable way, for instance using a centrifugal atomizer or air jets contained within a drying chamber. Conditions, such as the temperature and relative humidity of the atmosphere in the chamber in which spraying is effected, the temperature of the suspension, the speed of the atomizer or the size of the orifice or orifices of the jet and the time of residence of the yeast in the drying chamber, must be chosen so that the product consists of discrete particles whose average diameter is between about 15 and about 500 microns, preferably from 20 to 200 microns and some agglomerates thereof and its dry matter content is between about 27 percent and 50 percent by weight, preferably from 40 percent to 45 percent.

Suitable conditions are shown by way of illustration in the examples, but in one air spraying device it was found that suitable temperatures for the incoming air or other gas, for instance nitrogen, are up to 200° C. or even higher, but preferably are about 50° to 90° C. Suitable temperatures of the outlet gas are up to about 70° C., and preferably between 20° C. and 35° C. This method of spray drying has a number of advantages over those methods commonly used which rely on filtration. For instance while it is difficult with methods of the latter type to get a product with more than about 35 percent of dry matter, by spray drying products of up to 45 percent dry matter can readily be obtained. Furthermore, it is very much easier to operate under sterile conditions with the process of the invention, since the air or other gas can be passed through absolute filters or treated chemically or by heat to reduce infection.

The product after this stage consists of discrete particles of yeast which agglomerate or loosely adhere to each other to make a crumbly mass which has a considerably greater volume to weight ratio than compressed yeast, a factor of commercial importance. It can be reconstituted and used in the same way as compressed yeast.

If, however, it is desired to produce active dried yeast, this product is then subjected to drying under mild conditions to give a product having a dry matter content of the order required for ADY. This varies according to the market requirements but a figure of 92 to 93 percent is usually satisfactory. However, our product can be further dried if desired up to about 97 percent dry matter. Drying may be done for instance by contacting it with a stream of air or other gas, for instance nitrogen, at a temperature and a relative humidity which is sufficient to give the desired results. It is important that the selected drying technique does not involve any mechanical mixing or the application of any pressure to the yeast at least until the dry matter content reaches 70–80 percent. A suitable method of drying is to distribute the spray dried yeast particles onto trays or a moving continuous belt and expose them to a recirculating stream of air. Suitable temperatures for the air are between 20° and 60° C., preferably 35°–45 C.

The relative humidity of the entering air will be related inter alia to its temperature and to the final dry matter content of the yeast which is required. For example during the final stage of drying, the relative humidity will generally be less than 45 percent, preferably between 35 and 45 percent.

The active dried yeast obtained according to the invention can readily be reconstituted by mixing with water to give an active yeast which can be used for the same purposes as compressed yeast. Its initial fermentative activity is good and it maintains its activity for a prolonged period of time. Unlike pellet dried yeast it can also be satisfactorily mixed directly with flour to give a dry mixture which may also contain other ingredients. If, as may well be the case, the moisture content of the flour is greater than that of the yeast, water will be gradually transferred from the four to the yeast after the mixture has been made, so that reconstitution is facilitated when water is eventually added.

The following examples illustrate how the invention may be carried into effect:

EXAMPLE 1

A suspension of yeast with a dry matter content (measured by a standardized test) of about 16 percent was obtained from a yeast factory where it had been propagated in an aerated molasses medium, washed and centrifuged as in the manufacture of compressed yeast. The strain of *Saccharomyces cerevisiae* used contained 8.4 percent and 2.69 percent phosphate (estimated as $P_2O_5$) on a dry matter basis.

This yeast suspension was transferred to a spray dryer in which it was pumped through a centrifugal atomizer to disperse it as droplets. It was mixed within the drying chamber with a stream of air entering at 90° C. After a residence time of about 10 seconds in the drying chamber, the partially dried yeast particles were transferred as a suspension in the dryer exhaust air which had a temperature of 37° C. to a cyclone separator where the product was separated and collected. It had a dry matter content of 33.3 percent and was of attractive appearance, being almost white in color. It had an average particle size of about 100 microns and was quite easily handled, being more free flowing than yeast particles obtained by a process involving filtration. The product was tested for fermentative activity by a standard test used for compressed yeast. The result is shown in table I compared with the fermentative activity of yeast from the same batch but in the compressed form as manufactured in the aforesaid factory.

EXAMPLE 2

The experiment quoted in example 1 was repeated using the same conditions except that the yeast suspension had a slightly higher dry matter content as indicated by the apparent viscosity.

The result was to decrease the effective humidity of the air within the spray dryer so increasing the rate of evaporation and thereby producing a drier product. The dry matter content of the product was 47.1 percent by weight and the average particle size was about 100 microns.

The result of this experiment is also indicated in table I.

TABLE I

| Sample | Dry matter content % | Fermentative Activity (ml. $CO_2$) |
|---|---|---|
| Example 1 | 33.3 | 130 |
| Example 2 | 47.1 | 152 |
| Block Product | 28.6 | 119 |

EXAMPLE 3

A suspension of yeast with a dry matter content of about 16 percent was obtained from a yeast factory where it had been propagated in an aerated molasses medium, washed and centrifuged as in the manufacture of dried pelletted yeast. This yeast contained 7 percent nitrogen and 2.04 percent phosphate on a dry matter basis.

The yeast suspension was passed through a spray dryer as in example 1, but at the air temperatures shown in table II and with a residence time of 6 seconds. The product from the spray dryer was spread to a depth of about 5 mm. on plastic trays which were then placed in a drying cabinet. Heated air was blown through the cabinet at the conditions of temperature and humidity shown in table II until the product had the desired moisture content.

The resultant product was a finely divided powder, creamy colored and of attractive appearance, which required no further processing when discharged from the trays into a collector. Its average particle size was from 80 to 100 microns.

As this product was considered to be particularly suitable for use in dry-mixed preparations of yeast and flour, it was tested for fermentative activity by a standard test for active dried yeast which included the dry mixing of yeast and flour. To give meaning to the test result, a sample of yeast from the same batch which had been converted in the factory to an active dried pelleted yeast was subjected to the same test with the exception that it was first necessary to reconstitute it with water. The results of these comparative tests are shown in table II and indicate that the product is at least as good in fermentative activity as that prepared by known methods.

EXAMPLE 4

A suspension of yeast was obtained from a yeast factory process similar to that obtained for example 3. It had been propagated from the same strain but had a nitrogen content of 6.75 percent and a phosphate content of 2.09 percent.

It was subjected to the same method of drying as example 3 but with different conditions. The test results and conditions of this example are indicated in table II and, as with example 3, are compared with an active dried pelleted yeast produced in the factory from the same batch of yeast.

The product of this example was similar in appearance and particle size to that of example 3. Its fermentative activity was slightly better than that of a comparable sample made by known methods.

EXAMPLES 5 and 6

In these examples still further conditions of drying were used and again good products were obtained. The conditions and results are also shown in table II.

TABLE II

| Sample | Spray dryer conditions | | Cabinet dryer conditions | | Test results | |
|---|---|---|---|---|---|---|
| | Inlet temp., °C. | Outlet temp., °C. | Air temp., °C. | Relative humidity, percent | Water content, percent | Fermentive activity (mls.. $CO_2$) |
| Example 3 | 50 | 22 | 23 | 17 | 9.0 | 110 |
| Pellet yeast related to Example 3 | | | | | 8.0 | 107 |
| Example 4 | 55 | 24 | 25 | 25 | 9.8 | 107 |
| Pellet yeast related to Example 4 | | | | | 7.4 | 100 |
| Example 5 | 70 | 32 | 41 | 31 | 3.4 | 100 |
| Pellet yeast related to Example 5 | | | | | 7.5 | 92 |
| Example 6 | 170 | 48 | 42 | 28 | 5.8 | 108 |
| Pellet yeast related to Example 6 | | | | | 7.1 | 99 |

We claim:

1. A method of preparing an active dried yeast with a dry matter content of from about 88 to 97 percent by weight, which comprises spray drying an aqueous suspension of yeast in a drying zone wherein the gas entering the zone is at a temperature up to about 200 C. and that leaving the zone is at a temperature up to about 70° C. to provide a yeast product consisting of particles whose average diameter is between about 15 and about 500 microns and which contains from about 27 to about 50 percent of dry matter by weight, and then subjecting the spray-dried yeast product to further drying in a gas at a temperature between about 20° and about 60° C. without any mechanical agitation or pressure at least until the dry matter content reaches at least 70 percent, said further drying being carried out until the yeast has a dry matter content of from about 88 to 97 percent by weight.

2. The method of preparing yeast as claimed in claim 1 wherein the spray drying conditions are adjusted to give a product whose particles have an average diameter between about 20 and about 200 microns.

3. The method of preparing yeast as claimed in claim 1 wherein the spray drying conditions are adjusted to give a product which contains from 40 to 45 percent dry matter by weight.

4. The method as claimed in claim 1 wherein said further drying is effected by means of recirculating air at a temperature of from about 20° to about 60° C. and a relative humidity of less than 45 percent.

5. The method as claimed in claim 1 wherein the gas coming into the spray dryer is at about 50° to 90° C. and that leaving the dryer is at about 20° to 35° C. while in said further drying, the recirculating gas is at between 35° and 45° C. and has a relative humidity of between about 35 percent and 45 percent.